United States Patent
Bertz et al.

(10) Patent No.: US 9,485,721 B1
(45) Date of Patent: Nov. 1, 2016

(54) DISCOVERY OF SERVICES BY MOBILE COMMUNICATION DEVICES USING A SERVICE REGISTRY INDEXED BY WIRELESS BEACONS

(71) Applicant: Sprint Communications Company L.P., Overland Park, KS (US)

(72) Inventors: Lyle T. Bertz, Lee's Summit, MO (US); Anurag S. Dani, San Diego, CA (US); Lucy Khogolo, Overland Park, KS (US); Melanie Luna, St. Peter's, MO (US); Ameya Madhusudan Parab, Richardson, TX (US); Ashish Pinninti, Manhattan, KS (US); Mohana Saketh Pulipaka, Manhattan, KS (US); Joao "Tex" Teixeira, Shawnee, KS (US); Vivek Vijayan, Baltimore, MD (US); Alexander Wine, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/619,667

(22) Filed: Feb. 11, 2015

(51) Int. Cl.
*H04W 48/16* (2009.01)
*H04W 4/00* (2009.01)
*H04W 76/02* (2009.01)
*H04W 60/00* (2009.01)
*H04W 4/02* (2009.01)

(52) U.S. Cl.
CPC ............. *H04W 48/16* (2013.01); *H04W 4/008* (2013.01); *H04W 60/00* (2013.01); *H04W 76/025* (2013.01); *H04W 4/02* (2013.01)

(58) Field of Classification Search
CPC ... H04W 48/16; H04W 4/008; H04W 60/00; H04W 76/025; H04W 4/02
See application file for complete search history.

(56) References Cited

U.S. PATENT DOCUMENTS

| | | | | |
|---|---|---|---|---|
| 2004/0077259 A1* | 4/2004 | Barri | ........................ | A63H 3/46 446/92 |
| 2004/0077359 A1* | 4/2004 | Bernas | ..................... | H04W 8/08 455/456.1 |
| 2011/0294483 A1* | 12/2011 | Sathish | ................... | H04L 51/10 455/418 |
| 2013/0260797 A1* | 10/2013 | Jones | ...................... | H04W 4/02 455/456.3 |
| 2016/0012517 A1* | 1/2016 | Woo | .................... | G06Q 30/0639 705/26.9 |
| 2016/0044460 A1* | 2/2016 | Cornaby | ............... | H04W 4/023 455/456.3 |
| 2016/0044583 A1* | 2/2016 | Bahram Pour | ....... | H04W 4/008 455/456.3 |
| 2016/0094598 A1* | 3/2016 | Gedikian | .............. | H04W 4/021 455/456.3 |

* cited by examiner

*Primary Examiner* — Barry Taylor

(57) ABSTRACT

A method of wirelessly accessing services of a server computer by a mobile communication device. The method comprises receiving a short-range radio beacon signal associated with a server computer, sending a request for information about services provided by the server computer associated with the beacon to a service registry via a long-range wireless communication link. The method further comprises, in response to receiving information about the services provided by the server computer, connecting to the server computer, accessing a service provided by the server computer. The method further comprises receiving a second beacon signal, determining that the second beacon's identity is not identified in the white list, and, in response to determining that the second beacon identity is not white listed, not attempting to access a second server computer associated with the second beacon.

16 Claims, 11 Drawing Sheets

US 9,485,721 B1

DISCOVERY OF SERVICES BY MOBILE COMMUNICATION DEVICES USING A SERVICE REGISTRY INDEXED BY WIRELESS BEACONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are providing more and more advanced functionality as the processing power of the devices increases. Applications or computer programs may be loaded onto the devices and executed to provide specialized functionality to the users of the devices. Some of the applications rely upon wireless communication to server computers that provide some of the information processing. The server computer may then transmit results or intermediate results to the device via a wireless communication link. The application on the device may then provide the results to the user or may complete the processing of the intermediate results received from the server computer.

SUMMARY

In an embodiment, a method of wirelessly accessing services of a server computer is disclosed. The method comprises wirelessly receiving a universal beacon by a mobile communication device, wherein beacons are short-range radio frequency (RF) signals that have a maximum effective range of less than 20 meters and extracting a beacon identity from the universal beacon by the mobile communication device. The method further comprises, responsive to determining the beacon identity of the universal beacon, wirelessly sending a request from the mobile communication device to a spatial server for a list of beacon identities of beacons proximate to the mobile communication device, wherein the request comprises an indication of the current location of the mobile communication device and the wirelessly sending is performed over a long-range RF communication link. The method further comprises receiving wirelessly over the long-range RF communication link by the mobile communication device the list of beacon identities, adding the list of beacon identities to a white list of beacon identities stored in the mobile communication device, and receiving a beacon having a beacon identity on the white list by the mobile communication device. The method further comprises, responsive to receiving the beacon identified on the white list, wirelessly sending over a long-range RF communication link a request, from the mobile communication device to a service registry, for identification of services provided by a server computer associated with the received beacon identified on the white list, wherein the request to the service registry comprises the beacon identity of the beacon identified on the white list. The method further comprises receiving wirelessly over the long-range RF communication link by the mobile communication device information about services provided by the server computer associated with the beacon identified on the white list, establishing a communication link with the server computer by the mobile communication device, and requesting service from the server computer by the mobile communication device.

In an embodiment, another method of wirelessly accessing services of a server computer is disclosed. The method comprises receiving a short-range radio beacon signal by a mobile communication device, where the beacon signal is associated with a server computer and determining by the mobile communication device that a beacon identity of the beacon signal is identified in a white list stored by the mobile communication device. The method further comprises, in response to determining that the beacon identity is white listed, sending a request for information about services provided by the server computer associated with the beacon signal by the mobile communication device to a service registry via a long-range wireless communication link. The method further comprises, in response to receiving information about the services provided by the server computer from the service registry, connecting to the server computer, accessing service provided by the server computer and receiving a second short-range radio beacon signal by the mobile communication device. The method further comprises determining by the mobile communication device that a second beacon identity of the second beacon signal is not identified in the white list and, in response to determining that the second beacon identity is not white listed, not attempting by the mobile communication device to access a second server computer associated with the second beacon.

In yet another embodiment, a method of wirelessly accessing services of a server computer is disclosed. The method comprises receiving a universal beacon by a mobile communication device, wherein beacons are short-range radio frequency (RF) signals that have a maximum effective range of less than 20 meters and, in response to receiving the universal beacon, the mobile communication device sending a request for a list of locating beacons to a spatial server. The method further comprises receiving a list of locating beacons by the mobile communication device and determining by the mobile communication device a received signal strength of one or more of the locating beacons identified in the received list. The method further comprises sending by the mobile communication device a request to the spatial server for a list of service beacons, wherein the request comprises information on the received signal strength of the one or more locating beacons, whereby the spatial server determines a location of the mobile communication device at least in part based on the information on the signal strength of the one or more locating beacons and receiving a list of service beacons by the mobile communication device from the spatial server. The method further comprises requesting information about a service provided by a server computer associated with one of the service beacons identified in the received list of service beacons from a service registry by the mobile communication device, communicatively coupling to the server computer by the mobile communication device, and accessing the service provided by the server computer by the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
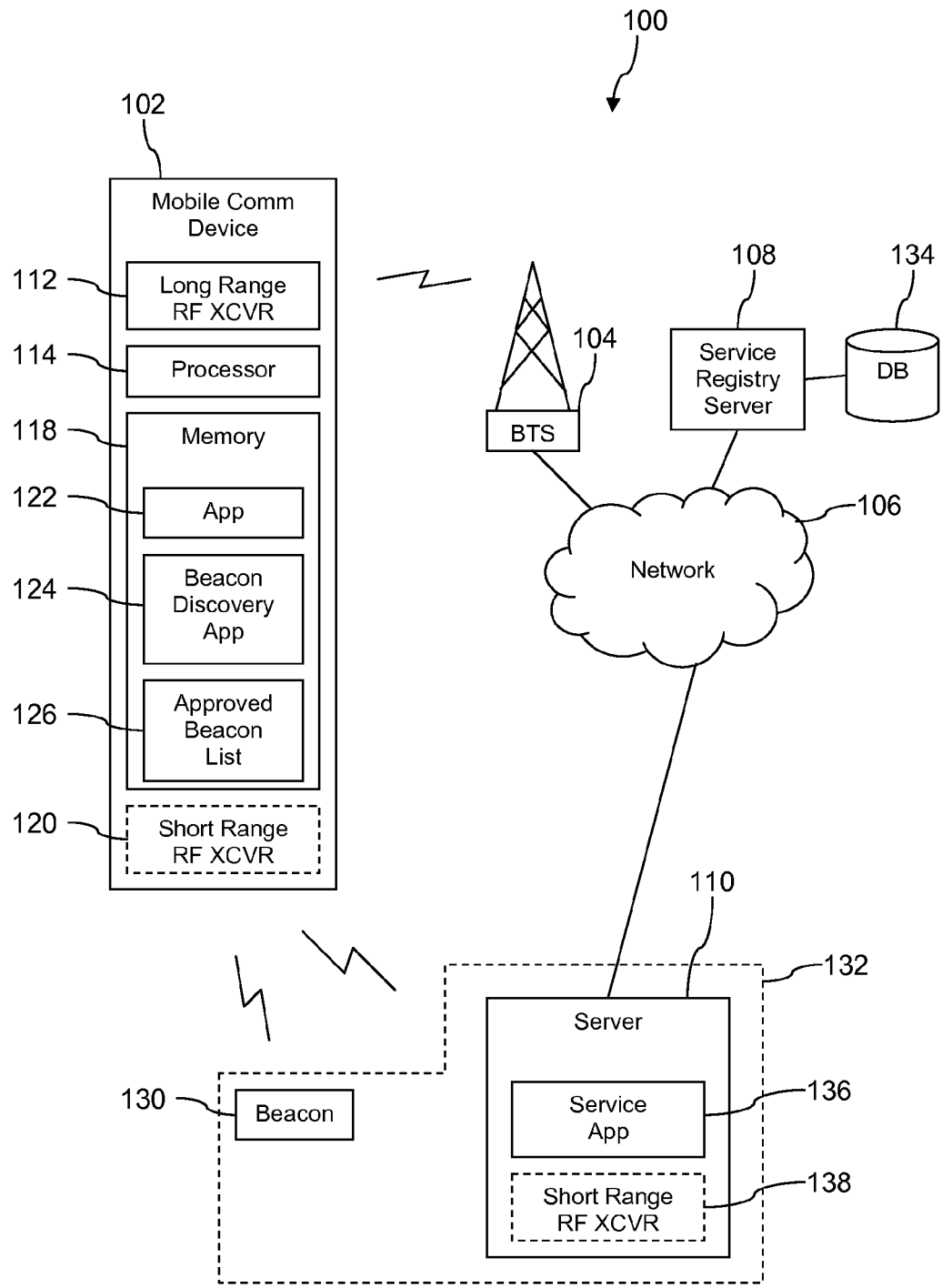
- FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless beacons may be used to identify a service, for example a service provided by a server computer. A wireless beacon is a short-range radio frequency signal that broadcasts an identity. The wireless beacon may be proximate to but autonomous from the computer that provides the service identified by the beacon. Alternatively, the wireless beacon may be coupled to the computer that provides the service, for example the wireless beacon may be provided by a peripheral device of the server computer. Alerted to the presence of the server computer by the beacon, mobile communication devices may attempt to connect to and to access the services provided by the server computer. The mobile communication device, however, may not know what service is associated with a wireless beacon, for example when the user of the mobile communication device is traveling or when a new service is first deployed. The present disclosure teaches a service registry that promotes a mobile communication device using information transmitted by the wireless beacon to index into the registry to look up the services provided by the server computer associated with the wireless beacon. The service registry may further provide connection information for the service, for example a WiFi security code or other connection information. The service registry may be provided by a server computer.

Some mobile communication devices may restrict wireless beacons that will be responded to using a list of allowed wireless beacons. For example, an application executing on the mobile communication device that supports accessing services may not respond to a wireless beacon if it is not explicitly identified in a white list maintained by the application. This function may provide some security for the mobile communication device. To promote refreshment and extension of the white list, the mobile communication device may send a request to a spatial server for a list of allowed wireless beacons proximate to the mobile communication device. The request may identify a current location of the mobile communication device. Alternatively, the request may provide information that the spatial server can interpret to identify the location of the mobile communication device. For example, the mobile communication device may send information associated with a signal transmitted by a universal wireless beacon that the mobile communication device receives, and the spatial server may infer the location of the mobile communication device from the location of the subject universal wireless beacon. The spatial server returns a list of approved wireless beacons or identities of wireless beacons to the mobile communication device in response to the request. The spatial server may select the transmitted list of approved wireless beacons from a larger list of approved wireless beacons based on the location of the mobile communication device, for example selecting those approved wireless beacons estimated to be within short radio range of the mobile communication device.

As used herein, a universal wireless beacon is a wireless beacon that is universally known to a set of mobile communication devices, for example the set of mobile communication devices configured to interoperate with the spatial server and/or service registry described herein. A universal wireless beacon may broadcast a universal identity that comprises a universal part—an identity that is the same from all universal wireless beacons—and a unique part—an identity that is unique to the specific universal wireless beacon. The mobile communication device may be configured to recognize the universal part of the universal identity (e.g., the universal part of the universal identity may be white listed in the mobile communication device). Alternatively, a universal wireless beacon may broadcast a unique identity, and the set of mobile communication devices may be configured with a list of the unique identities of the universal wireless beacons.

In an embodiment, the spatial server may respond to the request from the mobile communication device with a list of spatial wireless beacons in proximity to the universal wireless beacon identified in the request. The mobile communication device may identify which of the spatial wireless beacons identified by the spatial server that it is able to receive. The mobile device may determine a received signal strength of each of those received spatial wireless beacons, and transmit the list of identities of the received spatial wireless beacons and the associated received signal strength to the spatial server. The spatial server knows the locations of the spatial wireless beacons and may analyze the list of received spatial wireless beacons and their associated received signal strength to infer the location of the mobile communication device. Based on the inferred location of the mobile communication device, the spatial server sends a list of allowed wireless beacons that are proximate to the mobile communication device.

The service registry helps the mobile communication device to discover and benefit from services that may be newly deployed or may be in an area the device has not been in before. This can provide increased functionality and satisfaction to users of mobile communication devices. Additionally, the optional spatial server can provide some security in this dynamic service discovery system, protecting the mobile communication device from malicious or rogue servers.

Turning now to FIG. 1, a system 100 is described. In an embodiment, system 100 comprises a mobile communication device 102, a base transceiver station (BTS) 104, a network 106, a service registry server 108, and a service platform 110. The mobile communication device may be a mobile phone, a smart phone, a personal digital assistant (PDA), a media player, a laptop computer, a notebook computer, a tablet computer, a wearable computer, or a headset computer. The mobile device 102 comprises a long range radio transceiver 112, a processor 114, a memory 118, and a short range radio transceiver 120. In an embodiment, the mobile communication device 102 may not comprise the short range radio transceiver 120 but instead may comprise a short range radio receiver (not shown). The memory 118 of the mobile communication device 102 may store an application 122, a beacon discovery application 124, and an approved beacon list 126.

The BTS 104 may provide a wireless communication link to the mobile communication device 102 and couple the device 102 to the network 106. The BTS 104 may provide the wireless communication link using one or more of a code division multiple access (CDMA), a global system for mobile communications (GSM), a long term evolution (LTE), or a worldwide interoperability for microwave access (WiMAX) wireless protocol. When the mobile communication device 102 and the BTS 104 communicate according to LTE, the mobile communication device 102 may be referred to as a user equipment (UE) and the BTS 104 may be referred to as an enhanced node B (eNB).

The long range radio transceiver 112 and the BTS 104 may be said to communicate via a long range radio link. As used herein, a long range radio link may operate over a range that extends from a short range to a maximum effective range of about 1 mile, to a maximum effective range of about 3 miles, to a maximum effective range of about 5 miles, or to a maximum effective range of about 10 miles.

As used herein, the maximum effective range of a radio communication link and/or a radio transceiver is the maximum distance that the radio communication link can provide reliable service under normal conditions. It may be that a radio signal can be detected at a distance that considerably exceeds the maximum effective range, but the information content of the radio signal may not be reliably received at that distance and hence this greater distance would not be considered to define the maximum effective range. Likewise, it may be that a radio signal can be received reliably at a distance that considerably exceeds the maximum effective range under abnormal conditions, such as an adventitious multipath condition under which the radio signal is boosted, but again this greater distance would not be considered to define the maximum effective range.

In some contexts, the long range radio link may be referred to as a macrocellular radio link. The network 106 may be one or more public communication networks, one or more private networks, or a combination thereof. While only one mobile communication device 102, one BTS 104, one service registry server 108, and one service platform 110 are illustrated in FIG. 1, it is understood that the system 100 may comprise any number of devices 102, BTSs 104, service registry servers 108, and/or service platforms 110.

The service platform 110 may be implemented as a server computer. A radio beacon 130 may be associated with the service platform 110. For example, the radio beacon 130 may be located near but autonomous from the service platform 110. The radio beacon 130 may be adhered to an enclosure of the service platform 110 or to a wall near the service platform 110. The radio beacon 130 may sit on top of the enclosure of the service platform 110. Alternatively, the radio beacon 130 may be a peripheral device of a server computer that implements the service platform 110. For example, the radio beacon 130 may be a circuit card in a slot of the server computer that implements the service platform 110. The area of proximity 132 of the beacon 130 to the service platform 110 indicates that there is not a physical connection of the beacon to the service platform. The service platform 110 comprises a service application 136 and an optional short range radio transceiver 138. The service application 136 provides a service to requesting devices, for example to the mobile communication device 102. The service may be a badge reader service at a building entrance that controls access to the building or in an elevator car that controls access to different floors of a building. The service may be a display controller that provides access to a display screen, for example allows the mobile communication device 102 to wirelessly transmit charts for presentation or to wirelessly stream a video for presentation on the display. It is understood that a wide variety of services are contemplated as compatible with the system disclosed herein and services yet to be invented or developed.

The radio beacon 130 may be a short range radio transmitter. The beacon 130 may be a Bluetooth® beacon. The beacon 130 may use another radio communication protocol. As used herein, a short range radio transmitter may be radio that has an effective range of less than about 500 feet. Alternatively, a short range radio transmitter may have an effective range of less than about 100 feet. Alternatively, a short range radio transmitter may have an effective range of less than about 50 feet. The beacon 130 may transmit a beacon or radio message that uniquely identifies the beacon 130. The beacon 130 may transmit its identification radio message substantially continuously. Alternatively, the beacon 130 may transmit its identification radio message periodically, for example every 10 seconds, every minute, every 5 minutes or at some other periodic rate.

In an embodiment, when the device 102 receives the short range radio signal transmitted by the radio beacon 130, the beacon discovery application 124 determines the unique identity of the radio beacon 130. The beacon discovery application 124 sends a look-up request for the services associated with the unique identity of the radio beacon 130 to the service registry server 108. The request is transmitted over the wireless link provided by the BTS 104 to the network 106 and from the network 106 to the service registry server 108. In some contexts, it may be said that the request is transmitted over the macro cellular network. When the service registry server 108 receives a request from the mobile communication device 102, the service registry server 108 uses the unique identity of the radio beacon 130 to look up the services provided by the service platform 110 associated with the radio beacon 130. The information about the services may include information identifying and describing the services as well as information that identifies an interface or application programming interface (API) through which to invoke the services. In an embodiment, the service registry server 108 may additionally look up connection information about how to establish a communication session with the service platform 110, for example a uniform resource locator (URL), an IP address, security tokens, and/or other access information. The service registry server 108 then returns the information on the services provided by the service platform 110 and optionally the connection information to the mobile communication device 102.

The beacon discovery application 124 may add a widget or icon to the screen of the mobile device 102. Alternatively, the beacon discovery application 124 may include the service provided by the service platform 110 in a list of other services that may be accessed by the user clicking on an icon, widget, or control button of the device 102. When the user selects the subject service, for example by clicking on the name of the service, the service platform 110 may install a client application 122 on the device 102. When the user selects the client application 122, the client application 122 may establish a communication connection to the service platform 110 and the service application 136. The communication connection may be provided via a wireless communication link between the mobile device 102 and the service platform 110, for example between the short range radio transceiver 120 and the short range radio transceiver 138. Alternatively, the communication connection may be provided via a wireless link between the BTS 104 and the mobile device 102 and from the BTS 104 to the network 106 to the service platform 110. When establishing the communication connection, the client application 122 may provide security tokens that were obtained from the service registry server 108 to the service application 136.

Figure 2:
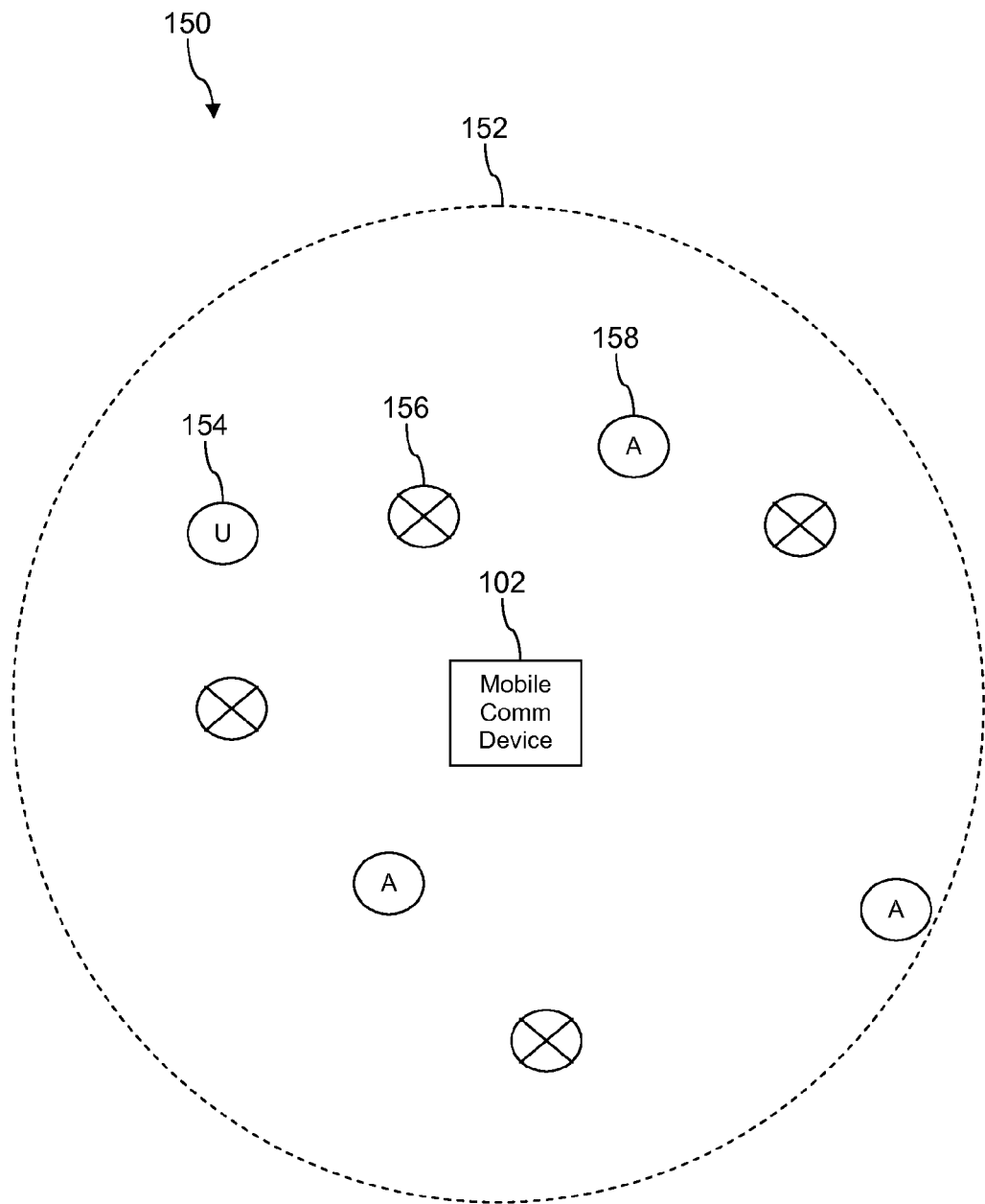
FIG. 2 is an illustration of a mobile communication device in an environment containing a plurality of radio frequency beacons according to an embodiment of the disclosure.

Turning now to FIG. 2, a system 150 is described. The perimeter of a short range radio reception area of the mobile communication device 102 described above with reference to FIG. 1 may be abstractly represented by the dotted line circle 152. It is understood that in practice, the limits of short range radio reception of the mobile device 102 may not be circular but may be oval, asymmetrical, lopsided. The idealized circle is merely an abstraction for purposes of discussion. A universal radio beacon 154 (denoted by a circle with a 'U' in the circle), a plurality of unknown radio beacons 156 (denoted by a circle with an 'X' in the circle), and a plurality of white listed radio beacons 158 (denoted by a circle with an 'A' in the circle) are located within the reception perimeter 152 of the mobile device 102.

The universal radio beacon 154 may have an identity that comprises a universal identity portion and a unique portion. The universal identity portion of the identity may be stored in the approved beacon list 126. Alternatively, the universal identity portion of the identity may be coded into the beacon discovery application 124. Alternatively, the universal radio beacon 154 may have an identity that is unique, and the mobile communication device 102 may be configured with a set of identities of universal radio beacons 154 across a service area—for example across the whole United States or across the wireless communication service area of a wireless communication service provider—for example stored in the approved beacon list 126 or coded into the beacon discovery application 124.

The white listed radio beacons 158 may be identified in the approved beacon list 126 stored in the memory 118 of the mobile device 102. The identities of the unknown radio beacons 156 are not stored in the approved beacon list 126. This may be because the unknown radio beacons 156 have not previously been discovered by the mobile device 102. Alternatively, one or more of the unknown radio beacons 156 may have been determined to be associated with service platforms 110 that distribute spam (i.e., unsolicited commercial promotions) or other undesirable behavior. On the other hand, some of the unknown radio beacons 156 (e.g., not white listed) may be associated with service platforms 110 that are not affiliated with a mobile communication service provider providing wireless service to the mobile communication device 102, for example service platforms 110 that are affiliated with a business competitor of the service provider.

When the mobile communication device 102 first receives the signal transmitted by the universal radio beacon 154, the beacon discovery application 124 may communicate via the long range radio transceiver 112 and the BTS 104 via the network to the service registry server 108. In some contexts, the reception by the mobile device 102 of the short range radio signal transmitted by the universal radio beacon 154 may be said to trigger the mobile device 102 to communicate to the service registry server 108. The beacon discovery application 124 may send the complete identity of the universal radio beacon 154 (e.g., a universal identity portion and a unique identity portion) to the service registry server 108. The service registry server 108 may infer the location of the mobile communication device 102 from a known location of the universal radio beacon 154. That is, the service registry server 108 may know the location of the universal radio beacon 154, may know the maximum radio range of the radio beacon radiated by the universal radio beacon 154, and infer from this information an approximate location of the mobile communication device 102. Using the inferred location of the mobile device 102, the service registry server 108 may look up approved radio beacons that are proximate to the mobile device 102 and send a list of the identities of these proximate approved radio beacons to the mobile device 102. The beacon discovery application 124 may store the identities of the proximate approved radio beacons in the approved beacon list 126.

The beacon discovery application 124 may send an additional request to the service registry server 108 via the long range radio transceiver 112 to learn what services are offered by the service platforms 110 to which the proximate approved radio beacons are associated and optionally to learn the details of how to connect to those service platforms 110 (e.g., to learn one or more of security tokens, universal reference locators, IP addresses, and the like). The mobile device 102 may store this information with the identities of the approved radio beacons in the approved beacon list 126 or alternatively elsewhere in memory. This process may be referred to as service discovery.

In an embodiment, the mobile device 102 may undergo the service discovery process only the first time it enters the radio reception area of the universal radio beacon 154. Alternatively, the mobile device 102 may repeat the service discovery process based on receiving the signal of the same universal radio beacon 154 periodically. This may result in refreshing the approved beacon list 126. For example, a new service platform 110 proximate to the universal radio beacon 154 may be added to the list of approved radio beacons maintained by the service registry server 108 after the first service discovery process is performed by the beacon discovery application 124. Additionally, repeating the service discovery process may promote removing defunct approved radio beacons from the approved beacon list 126, for example when a service platform 110 is removed from operation. For example, the beacon discovery application 124 may remove wireless beacons from the approved beacon list 126 if they are not returned in the list of approved radio beacons associated with a same universal beacon identity 154 and/or with a same general location. Likewise, the mobile device 102 may periodically repeat the process of requesting information about the services provided by and the information for connecting with the service platforms 110. This may support learning of new services deployed by the already known service platforms 110 and/or learning of changed communication connection information.

Figure 3:
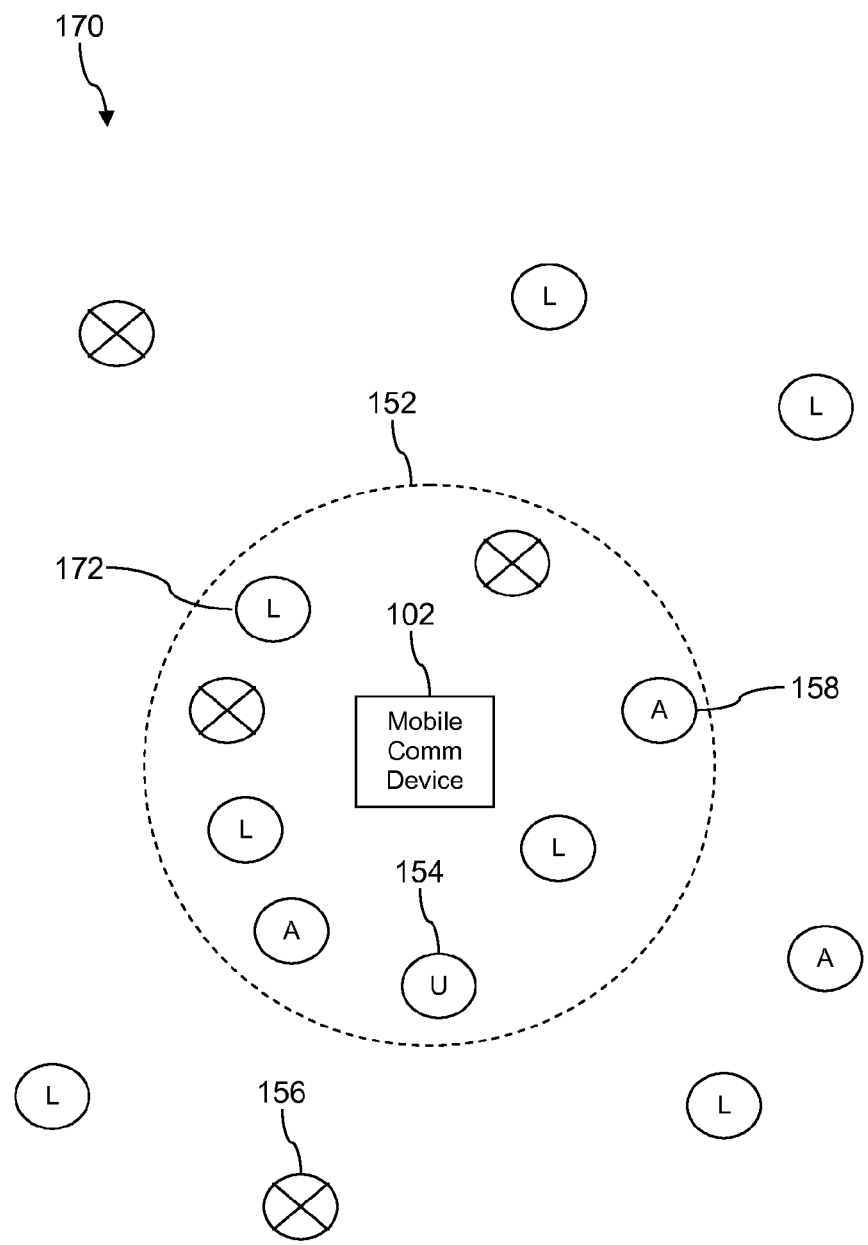
FIG. 3 is an illustration of a mobile communication device in another environment containing a plurality of radio frequency beacons according to an embodiment of the disclosure.

Turning now to FIG. 3, a system 170 is described. The system 170 comprises elements described above with reference to FIG. 1 and FIG. 2. The system 170 further comprises one or more locating radio beacons 172 (denoted by a circle with an 'L' in the circle). The system 170 may be referred to in some contexts as a multi-tier service discovery system.

When the mobile device 102 detects the radio signal transmitted by the universal radio beacon 154, the beacon discovery application 124 sends a request to the service registry server 108 along with the identity of the universal radio beacon 154. The service registry server 108 knows the location of the universal radio beacon 154 and, based on the known location of the universal radio beacon 154, looks up one or more locating radio beacons 172 that are proximate to the universal radio beacon 154 and sends the radio beacon identities of these locating radio beacons 172 to the beacon discovery application 124. The beacon discovery application 124 determines which of the radio signals of the identified locating radio beacons 172 it can receive. The radio signal strength of the received locating radio beacons 172 is determined. The beacon discovery application 124 sends a request to the service registry server 108 for proximate approved radio beacons 158 along with the identities of the received locating radio beacons 172 and their associated received signal strengths.

The service registry server 108 analyzes the received signal strengths of the identified locating radio beacons 172 to determine a location of the mobile communication device 102. Based on the determined location of the mobile communication device 102, the service registry server 108 looks up proximate approved radio beacons 158 in the data store 134 and returns the identities of the proximate approved radio beacons 158 to the beacon discovery application 124. The mobile device 102 stores the identities of the proximate approved radio beacons 158 in the approved beacon list 126 and stores any connection information it receives. The mobile device 102 may then request information about the services provided by the proximate approved radio beacons 158 and any connection information associated with the service platforms 110. The multi-tiered radio beacon discovery system 170 may provide more accurate locating information, and this may provide better access to services provided by service platforms 110 for the mobile device 102.

Figure 4A:
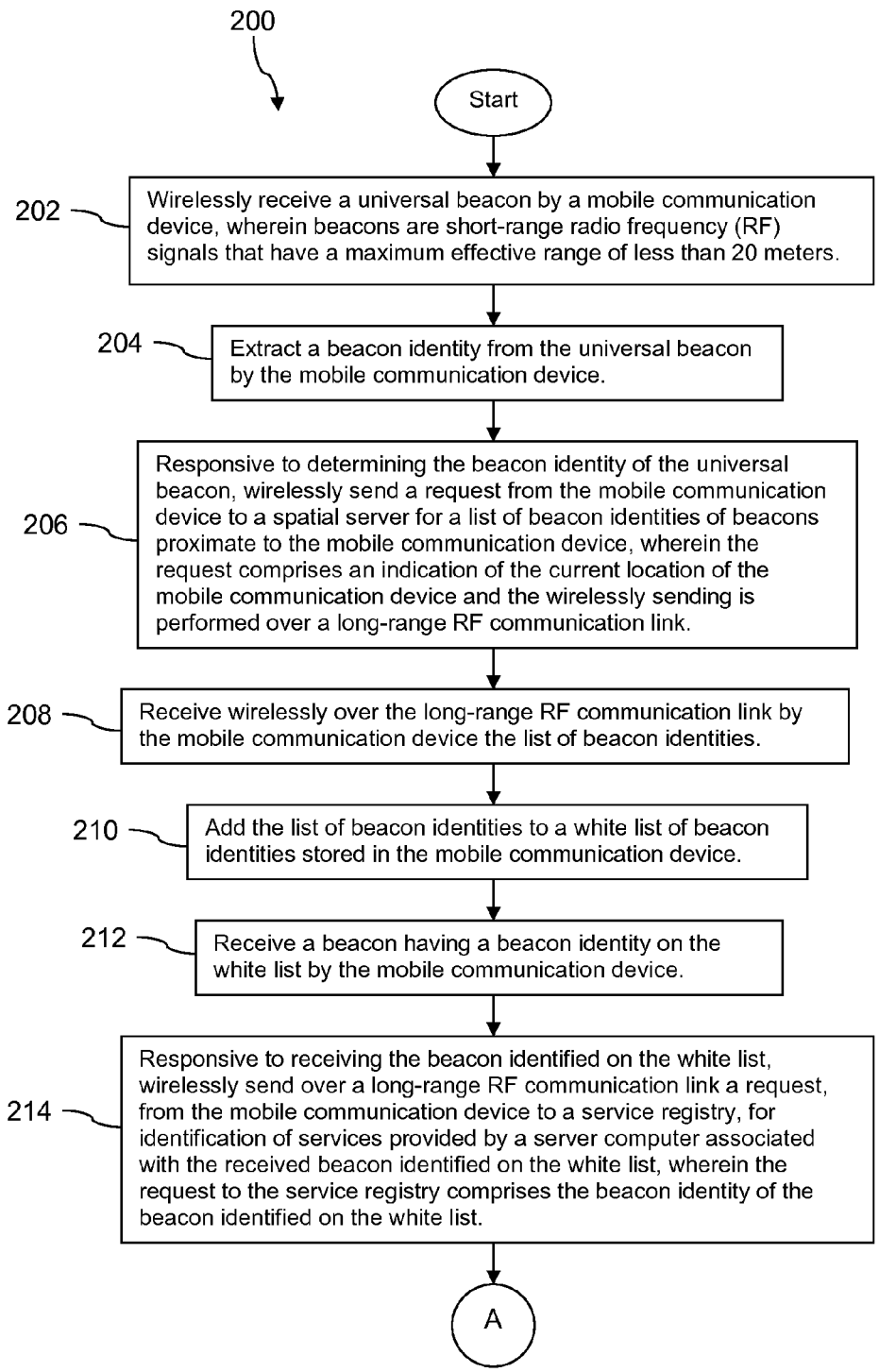
FIG. 4A and FIG. 4B are a flow chart of a method according to an embodiment of the disclosure.
Figure 4B:
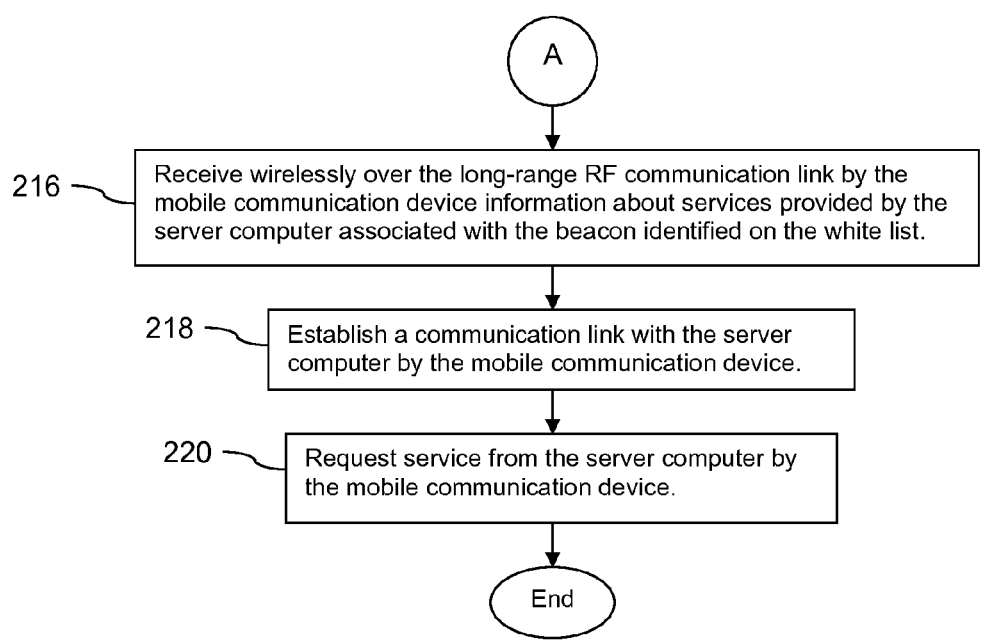

Turning now to FIG. 4A and FIG. 4B, a method 200 is described. At block 202, wirelessly receive a universal beacon by a mobile communication device, wherein beacons are short-range radio frequency (RF) signals that have a maximum effective range of less than 20 meters. At block 204, extract a beacon identity from the universal beacon by the mobile communication device. At block 206, responsive to determining the beacon identity of the universal beacon, wirelessly sending a request from the mobile communication device to a spatial server for a list of beacon identities of beacons proximate to the mobile communication device, wherein the request comprises an indication of the current location of the mobile communication device and the wirelessly sending is performed over a long-range RF communication link.

At block 208, wirelessly receive the list of beacon identities over the long-range RF communication link by the mobile communication device. At block 210, add the list of beacon identities to a white list of beacon identities stored in the mobile communication device. At block 212, receive a beacon having a beacon identity on the white list by the mobile communication device. At block 214, responsive to receiving the beacon identified on the white list, wirelessly send over a long-range RF communication link a request, from the mobile communication device to a service registry, for identification of services provided by a server computer associated with the received beacon identified on the white list, wherein the request to the service registry comprises the beacon identity of the beacon identified on the white list.

At block 216, wirelessly receive information about services provided by the server computer associated with the beacon identified on the white list over the long-range RF communication link by the mobile communication device. The received information may comprise an identification and/or description of the services provided by the server computer (e.g., the service platform 110). The received information may comprise identification and/or description of an interface or API for accessing the services. The received information may comprise connection information (URL, IP address, or other) and/or security tokens for connecting to the server computer. At block 218, establish a communication link with the server computer by the mobile communication device. At block 220, request service from the server computer by the mobile communication device.

Figure 5:
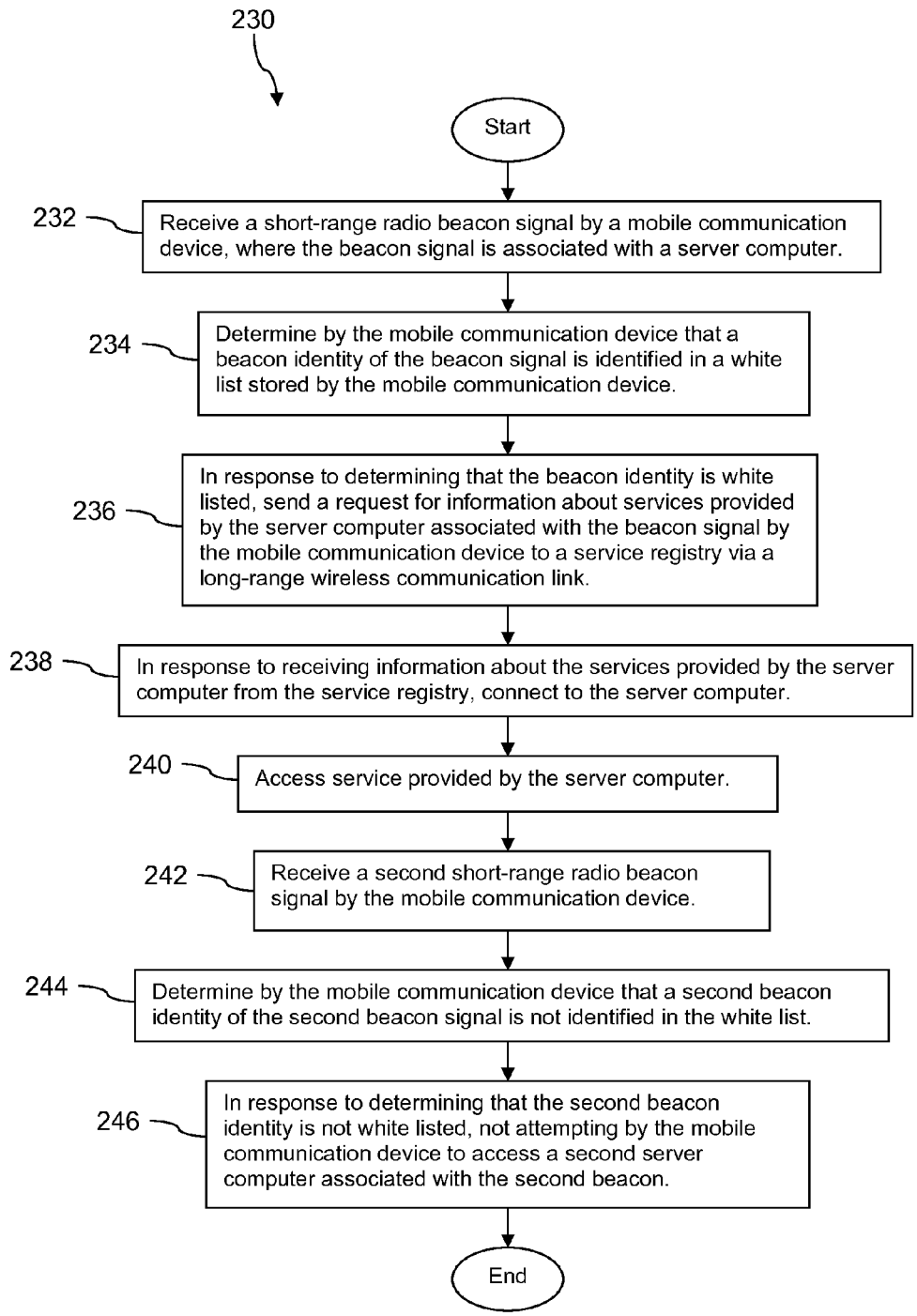
FIG. 5 is a flow chart of another method according to an embodiment of the disclosure.

Turning now to FIG. 5, a method 230 is described. At block 232, receive a short-range radio beacon signal by a mobile communication device, where the beacon signal is associated with a server computer. At block 234, determine by the mobile communication device that a beacon identity of the beacon signal is identified in a white list stored by the mobile communication device. At block 236, in response to determining that the beacon identity is white listed, send a request for information about services provided by the server computer associated with the beacon signal by the mobile communication device to a service registry via a long-range wireless communication link.

At block 238, in response to receiving information about the services provided by the server computer from the service registry, connecting to the server computer. At block 240, access service provided by the server computer. At block 242, receive a second short-range radio beacon signal by the mobile communication device. At block 244, determine by the mobile communication device that a second beacon identity of the second beacon signal is not identified in the white list. At block 246, in response to determining that the second beacon identity is not white listed, not attempting by the mobile communication device to access a second server computer associated with the second beacon.

Figure 6:
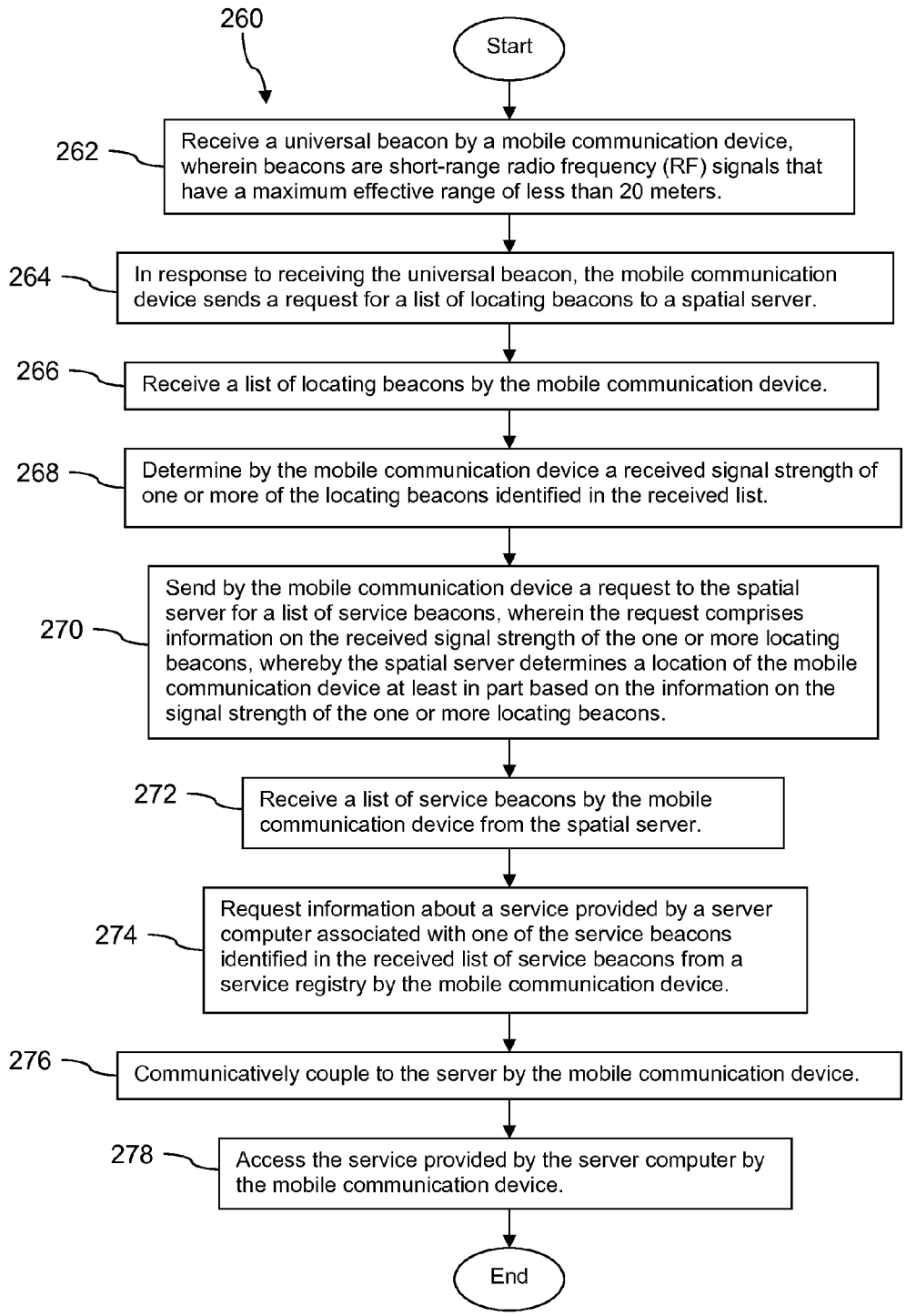
FIG. 6 is a flow chart of yet another method according to an embodiment of the disclosure.

Turning now to FIG. 6, a method 260 is described. At block 262, receive a universal beacon by a mobile communication device, wherein beacons are short-range radio frequency (RF) signals that have a maximum effective range of less than 20 meters. At block 264, in response to receiving the universal beacon, the mobile communication device sends a request for a list of locating beacons to a spatial server. At block 266, receive a list of locating beacons by the mobile communication device.

At block 268, determine by the mobile communication device a received signal strength of one or more of the locating beacons identified in the received list (those radio beacons that the mobile device can receive). At block 270, send by the mobile communication device a request to the spatial server for a list of service beacons, wherein the request comprises information on the received signal strength of the one or more locating beacons, whereby the spatial server determines a location of the mobile communication device at least in part based on the information on the signal strength of the one or more locating beacons. It is understood that the spatial server knows the location of location beacons.

At block 272, receive a list of service beacons by the mobile communication device from the spatial server. At block 274, request information about a service provided by a server computer associated with one of the service beacons identified in the received list of service beacons from a service registry by the mobile communication device. At block 276, communicatively couple to the server computer by the mobile communication device. At block 278, access the service provided by the server computer by the mobile communication device.

Figure 7:
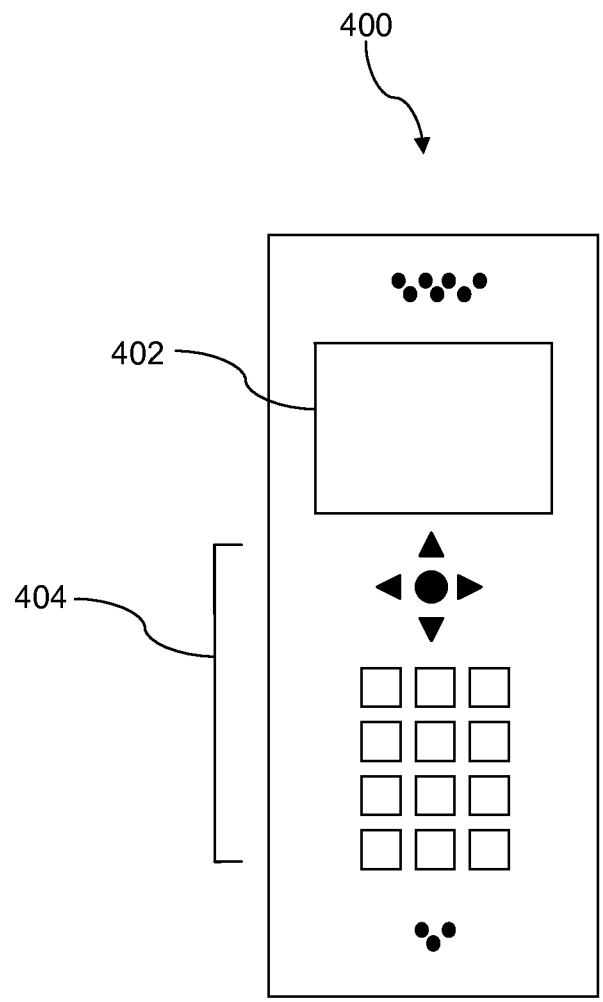
FIG. 7 is an illustration of a handset according to an embodiment of the disclosure.

FIG. 7 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 8:
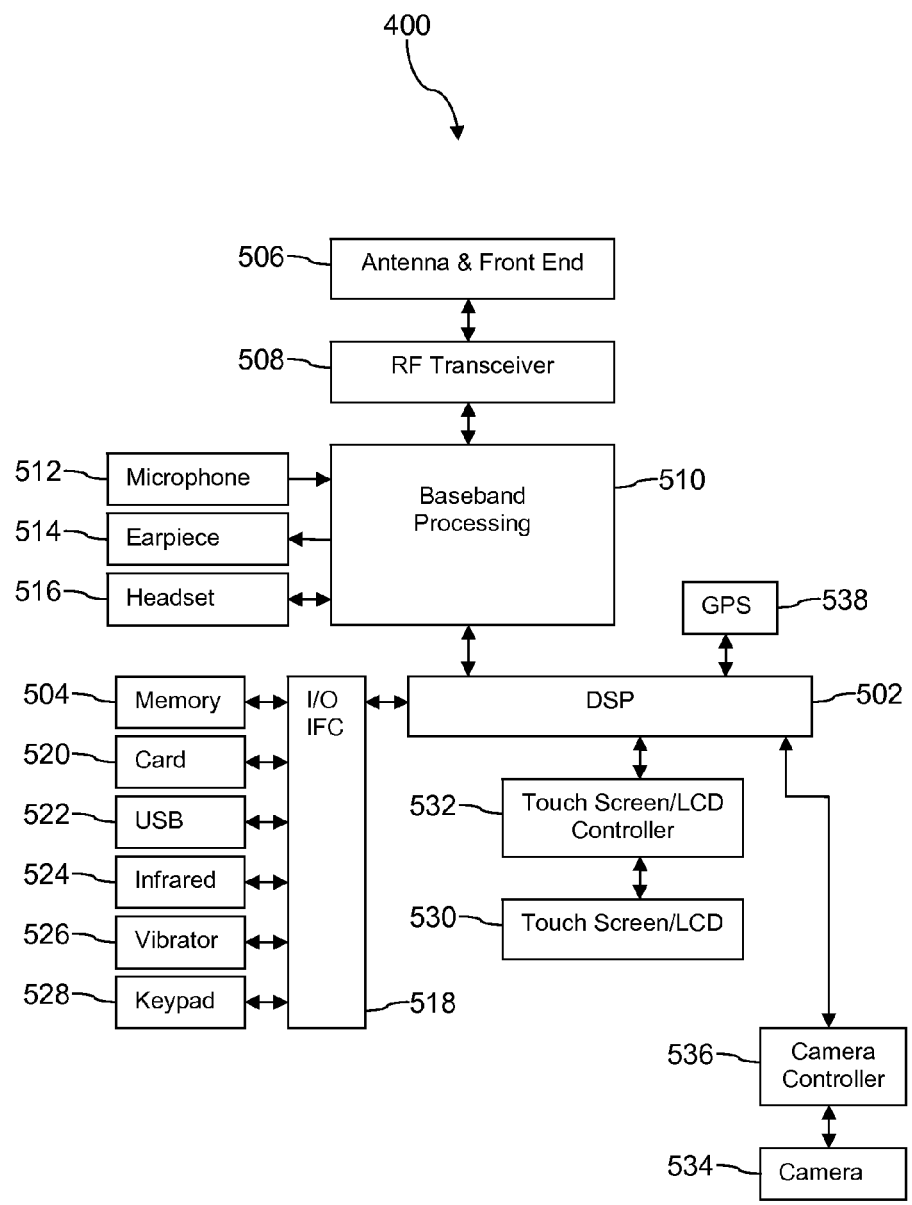
FIG. 8 is a block diagram of a hardware architecture of a handset according to an embodiment of the disclosure.

FIG. 8 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 9A:
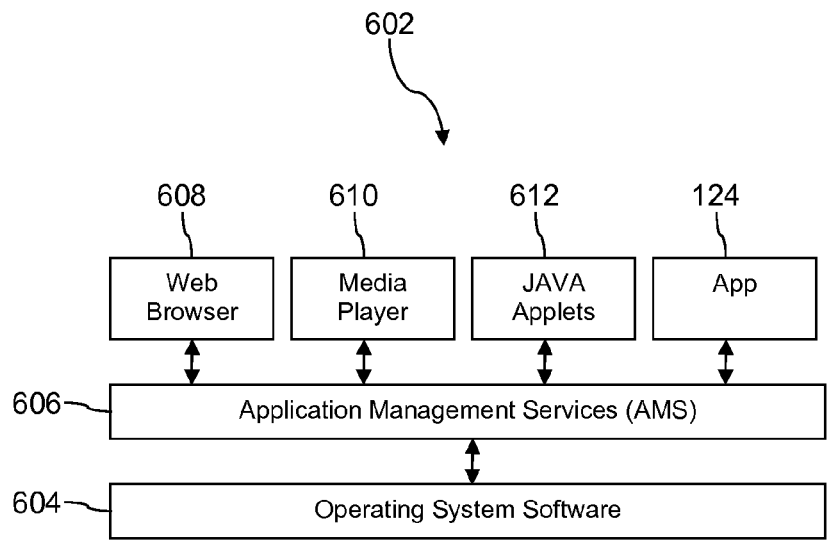
FIG. 9A is a block diagram of a software architecture of a handset according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 9A are a web browser application 608, a media player application 610, and JAVA applets 612, and the beacon discovery application 124. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audio-visual media. The JAVA applets 612 may be executed by the mobile device 400 to provide a variety of functionality including games, utilities, and other functionality.

Figure 9B:
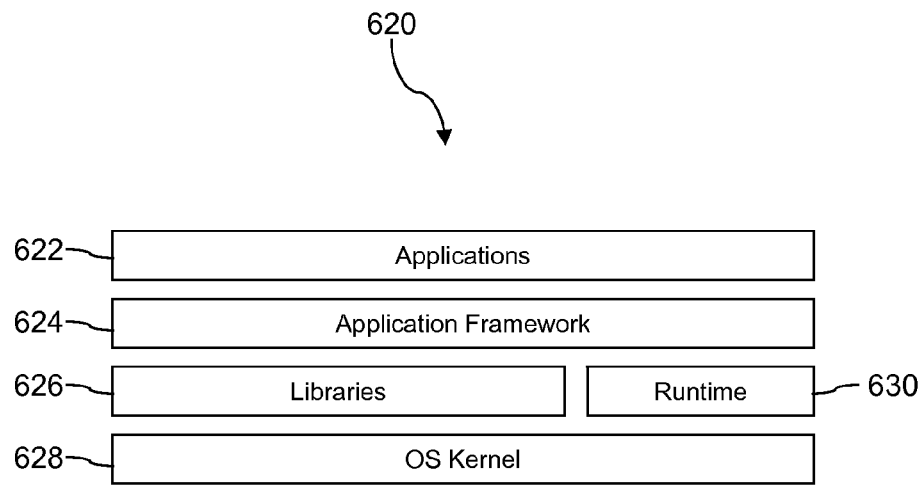
FIG. 9B is a block diagram of another software architecture of a handset according to an embodiment of the disclosure.

FIG. 9B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
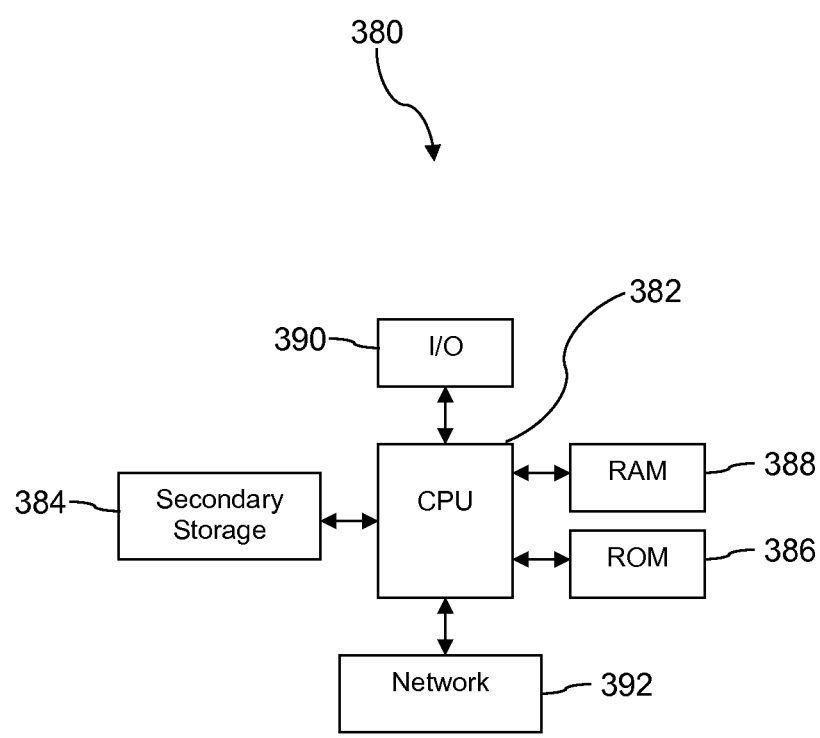
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of.

During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of wirelessly accessing services of a server computer, comprising:

wirelessly receiving, by a mobile communication device, a universal beacon that is universally known to a set of devices to which the mobile communication device belongs, wherein beacons are short-range radio frequency signals that have a maximum effective range of less than 20 meters;

determining a universal beacon identity based on the universal beacon;

responsive to determining the universal beacon identity wirelessly sending a request from the mobile communication device to a spatial server for a locating beacon list comprising at least one locating beacon identity corresponding to at least one locating beacon proximate to the mobile communication device, wherein the request comprises the universal beacon identity;

wirelessly receiving, by the mobile communication device, the locating beacon list from the spatial server;
determining the one or more locating beacons identified by the locating beacon list which the mobile communication device is capable of receiving;
determining a signal strength of the one or more locating beacons identified by the locating beacon list which the mobile communication device is capable of receiving;
responsive to determining the signal strength, wirelessly sending a request comprising the signal strength from the mobile communication device to the spatial server for an approved beacon list comprising approved beacon identities of approved beacons determined to be proximate to the mobile communication device according to the signal strength;
wirelessly receiving, by the mobile communication device, the approved beacon list from the spatial server;
adding the approved beacon identities included in the approved beacon list to a white list comprising approved beacon identities and stored in the mobile communication device;
receiving, by the mobile communication device, an approved beacon having an approved beacon identity on the white list;
responsive to receiving the approved beacon identified on the white list, wirelessly sending, by the mobile communication device, a request comprising the approved beacon identity of the received approved beacon identified on the white list to a service registry, wherein the approved beacon identity is indexed into the service registry to determine services provided by the server computer that is associated with the received approved beacon identified on the white list;
based on indexing the approved beacon identity into the service registry, receiving wirelessly, by the mobile communication device from the service registry, information about the services provided by the server computer associated with the received approved beacon identified on the white list;
responsive to receiving the information from the service registry about the services provided by the server computer, installing at least one of a widget or an icon to a screen of the mobile communication device, wherein the at least one widget or icon corresponds to one or more of the services provided by the server computer;
establishing, by the mobile communication device, a communication link with the server computer based on a selection of the at least one widget or icon; and
requesting, by the mobile communication device from the server computer, a service corresponding to the at least one widget or icon.

2. The method of claim 1, wherein the beacons are Bluetooth signals.

3. The method of claim 1, wherein the mobile communication device communicates with the spatial server over a long-range radio frequency communication link provided by one of a code division multiple access (CDMA), a global system for mobile communication (GSM), a long-term evolution (LTE), or a worldwide interoperability for microwave access (WiMAX) telecommunications protocol.

4. The method of claim 1, wherein the information about services provided by the server computer associated with the approved beacon identified on the white list comprises information about how to establish the communication link with the server computer.

5. The method of claim 4, wherein the information about services provided by the server computer comprises an Internet Protocol (IP) address of the server computer and security tokens for connecting to the server computer.

6. A method of wirelessly accessing services of a server computer, comprising:
receiving a universal beacon by a mobile communication device, wherein the universal beacon provides an indication of a location of the mobile communication device;
transmitting a request, based on the universal beacon, to a spatial server for one or more locating beacon identities corresponding to one or more locating beacons that are proximate to the location of the mobile communication device;
receiving a locating beacon list comprising the one or more locating beacon identities from the spatial server;
determining a signal strength of the one or more locating beacons identified by the locating beacon list which the mobile communication device is capable of receiving;
transmitting a request, based on the signal strength, to the spatial server for identities of one or more approved beacons determined to be proximate to the mobile communication device according to the signal strength for which the mobile communication device is permitted to receive a beacon signal, wherein the identities of the one or more approved beacons are stored on a white list by the mobile communication device;
receiving the identities of the one or more approved beacons for which the mobile communication device is permitted to receive a beacon signal;
receiving a beacon signal by the mobile communication device, where the beacon signal is associated with a server computer;
determining by the mobile communication device that a beacon identity of the beacon signal is identified in the white list stored by the mobile communication device;
in response to determining that the beacon identity is white listed, sending a request for information about services provided by the server computer associated with the beacon signal by the mobile communication device to a service registry, wherein the request comprises the beacon identity, and wherein the beacon identity is indexed into the service registry to determine the services provided by the server computer associated with the beacon signal;
in response to receiving the information about the services provided by the server computer from the service registry based on indexing the beacon signal into the service registry, installing at least one of a widget or an icon to a screen of the mobile communication device, wherein the at least one of the widget or the icon corresponds to at least one service provided by the server computer;
connecting to the server computer in response to a selection of the at least one of the widget or the icon only when the beacon identity is white listed; and
accessing the at least one service provided by the server computer.

7. The method of claim 6, wherein the beacon signal has a maximum effective range of less than 50 feet.

8. The method of claim 6, wherein the beacon signal is a Bluetooth signal.

9. The method of claim 6, wherein an application executing on the mobile communication device is blocked at the application layer from attempting to receive beacon signals that are not white listed.

10. A method of wirelessly accessing services of a server computer, comprising:
- receiving a universal beacon by a mobile communication device, wherein beacons are short-range radio frequency signals that have a maximum effective range of less than 20 meters;
- in response to receiving the universal beacon, sending, by the mobile communication device, a request based on the universal beacon to a spatial server for a list of locating beacons proximate to the mobile communication device;
- receiving the list of locating beacons by the mobile communication device;
- determining, by the mobile communication device, a received signal strength of one or more of the locating beacons identified in the received list of locating beacons;
- sending, by the mobile communication device, a request to the spatial server for a list of service beacons determined to be proximate to the mobile communication device according to the signal strength of the one or more of the locating beacons, wherein the request comprises information on the received signal strength of the one or more locating beacons;
- receiving the list of service beacons by the mobile communication device from the spatial server, wherein the list of service beacons comprises service beacons that the mobile communication device is permitted to communicate with;
- requesting information about a service provided by a server computer associated with one of the service beacons identified in the received list of service beacons from a service registry by the mobile communication device, wherein requesting the information about the service provided comprises transmitting a beacon identity of the one of the service beacons identified in the received list of service beacons to the service registry, and wherein the beacon identity is indexed into the service registry to determine the service provided by the server computer associated with the one of the service beacons identified in the received list of service beacons;
- in response to receiving the information from the service registry about the service provided by the server computer based on indexing the beacon identity into the service registry, installing at least one of a widget or an icon to a screen of the mobile communication device, wherein the at least one of the widget or the icon corresponds to the service provided by the server computer;
- communicatively coupling to the server computer by the mobile communication device in response to a selection of the at least one of the widget or the icon; and
- accessing the service provided by the server computer by the mobile communication device.

11. The method of claim 10, wherein the mobile communication device communicates with the spatial server and with the service registry via a cellular communication link.

12. The method of claim 10, wherein the mobile communication device is one of a mobile phone, a personal digital assistant (PDA), a media player, a laptop computer, a notebook computer, or a tablet computer.

13. The method of claim 10, wherein the service beacon is a radio frequency emitting device that is not communicatively coupled to the server computer with which it is associated.

14. The method of claim 10, wherein the beacons are Bluetooth beacons.

15. The method of claim 10, wherein the mobile communication device communicatively couples to the server computer via a WiFi access point.

16. The method of claim 10, wherein the mobile communication device communicatively couples to the server computer via a cellular communication link.

* * * * *